(12) United States Patent
Vaucher et al.

(10) Patent No.: US 12,736,653 B2
(45) Date of Patent: Sep. 15, 2026

(54) MIMO RADAR TRANSMISSION AND SIGNAL PROCESSING

(71) Applicant: NXP B.V., Eindhoven (NL)

(72) Inventors: Cicero Silveira Vaucher, Eindhoven (NL); Feike Guus Jansen, Eindhoven (NL)

(73) Assignee: NXP B.V., Eindhoven (NL)

( * ) Notice: Subject to any disclaimer, the term of this patent is extended or adjusted under 35 U.S.C. 154(b) by 239 days.

(21) Appl. No.: 18/539,578

(22) Filed: Dec. 14, 2023

(65) Prior Publication Data

US 2025/0199152 A1 Jun. 19, 2025

(51) Int. Cl.

*G01S 13/48* (2006.01)
*G01S 7/282* (2006.01)
*G01S 7/288* (2006.01)
*G01S 13/28* (2006.01)
*G01S 13/931* (2020.01)

(52) U.S. Cl.

CPC .............. *G01S 13/48* (2013.01); *G01S 7/282* (2013.01); *G01S 7/2883* (2021.05); *G01S 13/282* (2013.01); *G01S 13/931* (2013.01)

(58) Field of Classification Search

CPC ........ G01S 13/48; G01S 7/2883; G01S 7/282; G01S 13/282; G01S 13/931

See application file for complete search history.

(56) References Cited

U.S. PATENT DOCUMENTS

| | | | | |
|---|---|---|---|---|
| 9,372,259 | B2 * | 6/2016 | Kishigami | G01S 13/26 |
| 11,555,882 | B2 | 1/2023 | Bai et al. | |
| 11,614,531 | B2 | 3/2023 | Wu et al. | |
| 2005/0152469 | A1 | 7/2005 | Fusco et al. | |
| 2017/0353338 | A1 * | 12/2017 | Amadjikpe | H01Q 21/245 |
| 2018/0088221 | A1 * | 3/2018 | Yomo | G01S 7/003 |
| 2018/0259632 | A1 * | 9/2018 | Kishigami | G01S 7/023 |
| 2019/0146059 | A1 * | 5/2019 | Zanati | G01S 13/931 342/173 |
| 2020/0382088 | A1 | 12/2020 | Saha | |
| 2021/0173042 | A1 * | 6/2021 | Wu | G01S 7/356 |

OTHER PUBLICATIONS

Nickolas, Von Christina; DigiKey "The Basics of Mixers"; Oct. 20, 2011; pp. 1-6; Retrieved from the Internet: https://www.digikey.com/en/articles/the-basics-of-mixers.

* cited by examiner

*Primary Examiner* — Nazra Nur Waheed

(57) ABSTRACT

A radar system includes a radar front end with multiple transmit antennas and multiple phase rotators. Each one of the multiple phase rotators is configured to output multiple phase modulated signals to a corresponding set of power amplifiers of a plurality of power amplifiers, where each power amplifier is coupled to one transmit antenna of the multiple transmit antennas.

18 Claims, 6 Drawing Sheets

MIMO RADAR TRANSMISSION AND SIGNAL PROCESSING

BACKGROUND

Many radar systems, such as those used in vehicles with Advanced Driver Assistance System (ADAS) or Autonomous Driving (AD) capabilities, rely on multiple-input multiple-output (MIMO) radar where multiple transmission (TX) elements are used to create a larger virtual array of reception (RX) elements to increase the angular resolution of the radar system. For example, a MIMO radar system with four TX elements and four RX elements can realize up to sixteen virtual RX elements. In order to be able to distinguish the signals transmitted from the different TX elements from one another after reception, each TX element is coupled to one of a corresponding number of phase rotators, and a digital controller implements a MIMO radar modulation scheme by controlling each one of the phase rotators to apply a different phase code to the signal that is transmitted from every TX element.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
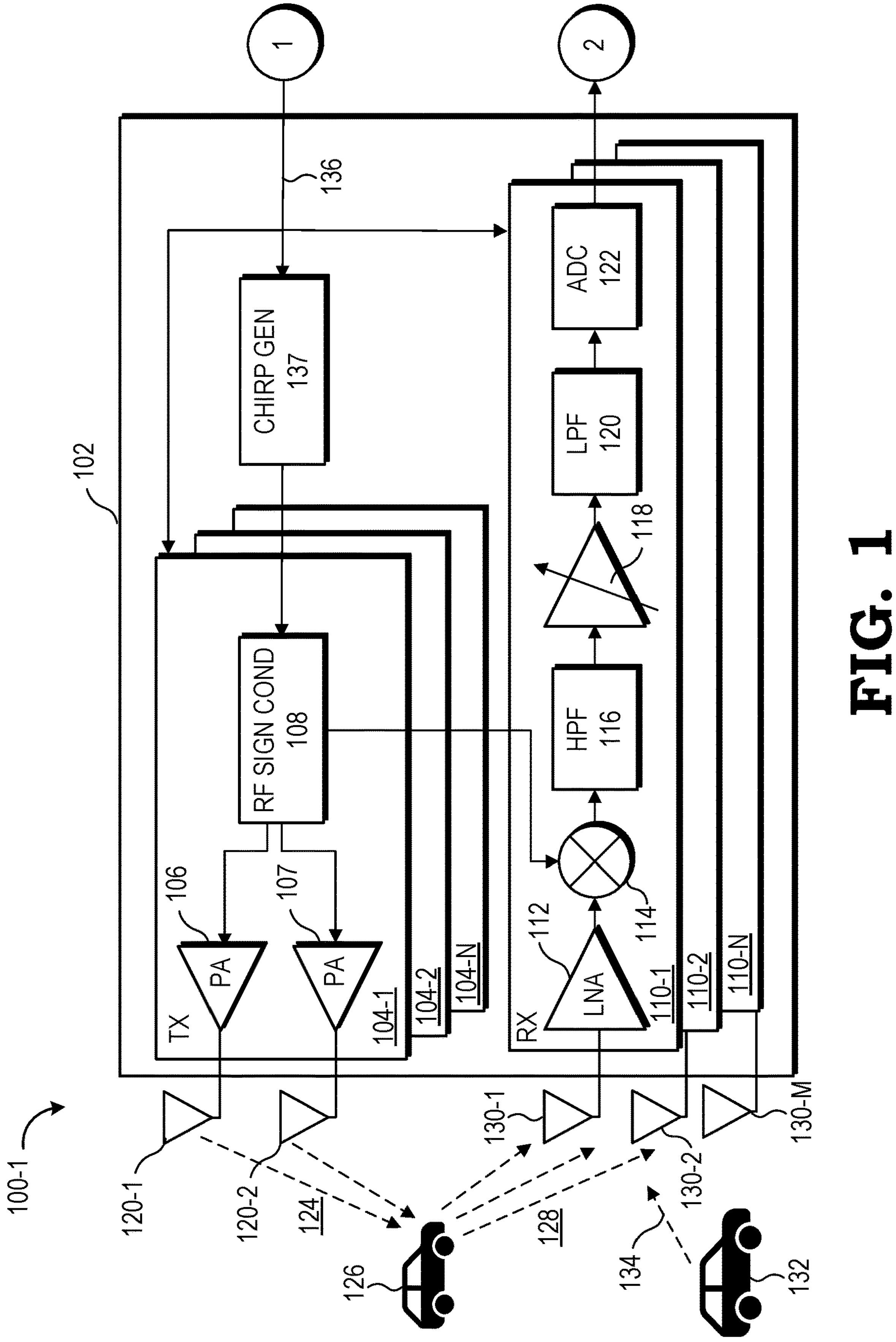
FIGS. 1 and 2 show examples of a radar front end and a radar master controller processing unit, respectively, in a radar system with a transmission configuration configured to implement radar modulation techniques in accordance with various embodiments.

One type of MIMO radar modulation scheme is Doppler division multiplexing (DDM). DDM applies the phase modulation along the slow-time scale (i.e., along a time scale covering multiple radar waveforms such as chirps in a radar waveform sequence) so that the energy of different TX elements is shifted to different portions of the range-Doppler data spectrum. In a DDM modulation scheme, the radar system sets the phase at the beginning of each radar chirp (e.g., at the beginning of each frequency ramp in a Frequency Modulated Continuous Waveform (FMCW) radar transmission setup) in the radar chirp sequence and the phase is kept constant during the transmission of the radar chirp. DDM relies on accurate control of the phase rotators coupled to each TX element to avoid errors that can degrade the radar system's performance. Conventional radar systems which include one phase rotator coupled to each TX element are capable of generating numerous phase or frequency offsets to implement DDM. However, these conventional radar systems have larger radar front end die areas and experience higher levels of power dissipation in the radar front end due to the relatively large number of phase rotators. FIGS. 1-7 provide transmission configurations and techniques that reduce the number of phase rotators required to implement MIMO radar modulation schemes such as DDM by allocating a single phase rotator to multiple TX elements. In addition, the transmission configurations and techniques described herein generate phase coded signals with non-uniform spectral intervals that facilitate the decoding of the received radar reflections, thereby increasing radar system performance.

To illustrate, in some embodiments, a radar system includes a radar front end with a plurality of transmit antennas that each are coupled to a power amplifier of a plurality of amplifiers. The radar front end also includes a plurality of phase rotators, and each phase rotator is coupled to multiple power amplifiers (e.g., two) of the plurality of power amplifiers. Each phase rotator is configured to generate multiple phase modulated signals based on a phase control signal and a local oscillator signal, and each one of the multiple phase modulated signals is input to a respective one of the multiple amplifiers that the phase rotator is coupled to. In this manner, a single phase rotator generates a plurality of phase modulated signals that are then relayed to multiple transmit antennas for transmission. This reduces the number of phase rotators used in the radar front end.

To further illustrate by way of example, in some embodiments, a first phase rotator is coupled to a first and a second power amplifier, and a second phase rotator is coupled to a third and a fourth power amplifier. Each one of the four power amplifiers is coupled to one of four TX elements. Each one of the first and second phase rotators are conjugate phase rotators that output a pair of phase modulated signals based on two inputs: a local oscillator signal that is common to all the phase rotators and a phase control signal received from a digital controller that is specific to the corresponding phase rotators. The first phase rotator outputs a first phase modulated signal of its pair of phase modulated signals to the first amplifier and outputs a second phase modulated signal of its pair of phase modulated signals to the second amplifier. Similarly, the second phase rotator outputs a first phase modulated signal of its pair of phase modulated signals to the third amplifier and outputs a second phase modulated signal of its pair of phase modulated signals to the fourth amplifier. Thus, a single phase rotator generates two phase modulated signals that are each input to a different power amplifier coupled to a corresponding TX element. This halves the number of phase rotators in the radar front end relative to the conventional approach, thereby decreasing the size of the radar front end die area and reducing the total power dissipation from the phase rotators.

In some embodiments, any of the elements, components, or blocks shown in the ensuing figures are implemented as one of software executing on a processor, hardware that is hard-wired (e.g., circuitry) to perform the various operations described herein, or a combination thereof. For example, one or more of the described blocks or components (e.g., blocks or components associated with phase modulation of the transmitted signals, blocks or components associated with radar signal processing, or the like) represent software instructions that are executed by hardware such as a digital signal processor, an application-specific integrated circuit (ASIC), a set of logic gates, a field programmable gate array (FPGA), programmable logic device (PLD), a hardware accelerator, a parallel processor, or any other type of hard-coded or programmable circuit. As another example, one or more of the described blocks or components (e.g., blocks or components associated with modulating the phase of a radar signal for transmission) represent hardware in a phase rotator such as a phase inverter, a combiner, or the like.

Figure 2:
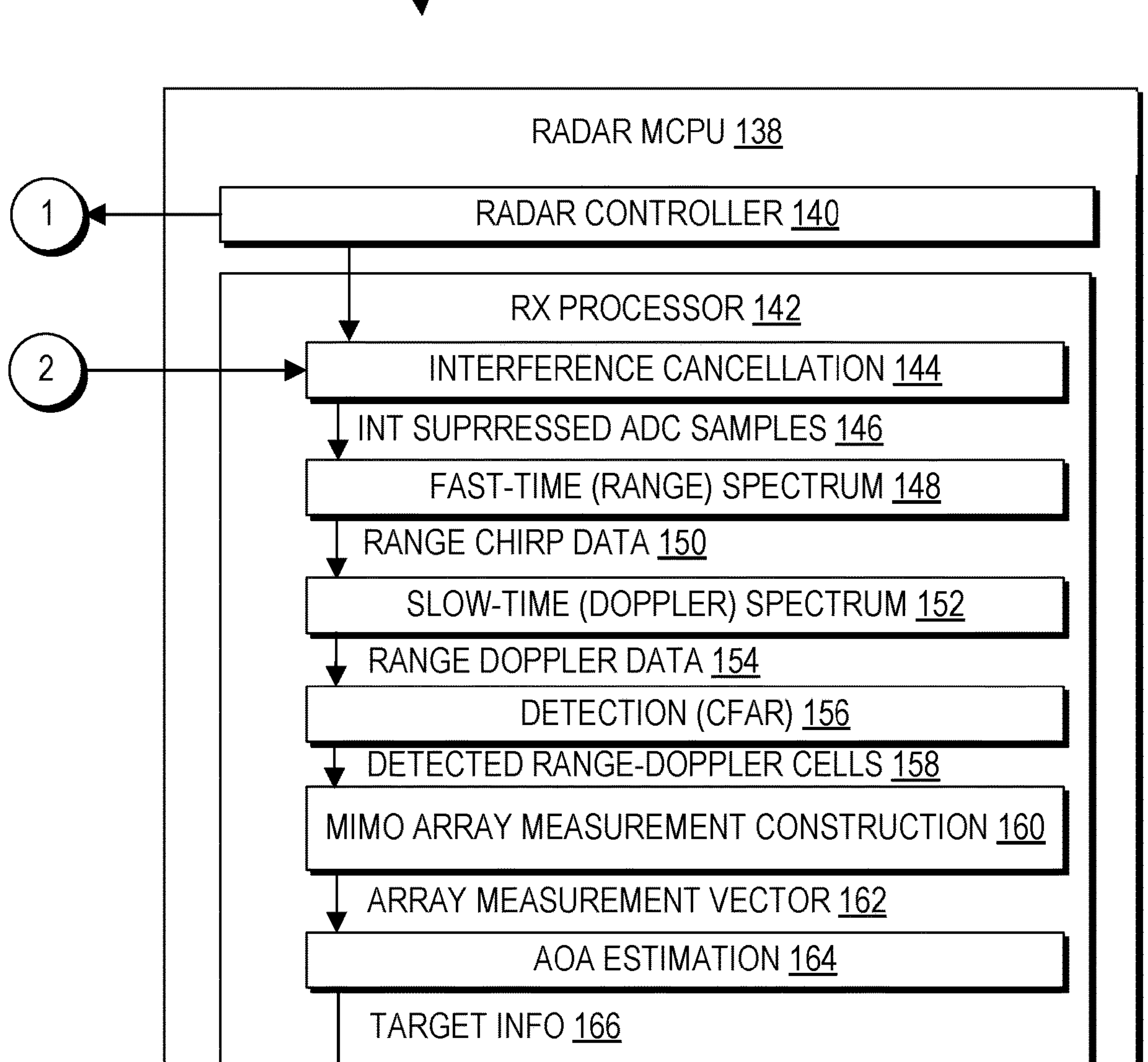

FIGS. 1 and 2 show an example of a radar system 100 (including a first radar system portion 100-1 of FIG. 1 and a second radar system portion 100-2 of FIG. 2) that implements the hardware configurations and phase modulation techniques described herein. FIG. 1 shows a radar front end 102 of the radar system 100 and FIG. 2 shows a radar master controller processing unit (MCPU) 138 of the radar system 100.

Referring to FIG. 1, in some embodiments, the radar front end 102 includes multiple transmitters 104-1 to 104-N (collectively referred to as transmitters 104). In some embodiments, each transmitter 104 includes a plurality of power amplifiers (PAs) 106, 107 and a radio frequency (RF) conditioning (cond.) component 108. The PAs 106, 107 convert a lower power RF signal into a higher power RF signal prior to transmission. For example, in some embodiments, the PAs 106, 107 are configured to convert a lower power RF signal including a plurality of chirps into a higher power RF signal. The RF conditioning component 108 includes hardware and/or software for modifying (i.e., conditioning) the signal received from the chirp generator 137 prior to providing it to the PA 106. For example, in some embodiments, the RF conditioning component 108 includes one or more filters that filter the RF signals prior to signal power amplification at PAs 106, 107, one or more phase modulators that modulate a phase of the signal prior to signal power amplification at one of PAs 106, 107, or the like.

In some embodiments, the radar front end 102 receives program, control trigger, and reference clock signals 136 that are utilized for chirp generation at a chirp generator 137 or received signal processing in the receivers 110. For example, the reference clock signal is a local oscillator (LO) signal, and the control trigger is a chirp start trigger signal that are input to the chirp generator 137 to generate radar chirp sequences that are further processed (e.g., by RF conditioning component 108 and PAs 106, 107) before being transmitted by the transmit antennas 120 of the radar front end 102. In some embodiments, the chirp generator 137 includes a phase locked loop (PLL) that generates linear frequency modulated chirp sequences. For example, the PLL in the chirp generator 137 generates an FMCW chirp sequence for transmission by the transmitters 104.

The radar front end 102 also includes transmission antennas 120. In some embodiments, each transmitter 104 is configured with its own transmission antennas 120 (e.g., transmitter 104-1 with transmission antennas 120-1, 120-2). Transmitters 104 send transmitted signals 124 toward one or more targets 126 (one labeled for clarity). The transmitted signals are reflected from the target 126, and the target reflected signals 128 (collectively referred to as target radar signal, radar reflections, or the like) are directed back to the radar system 100. The target reflected signals 128 are received by reception antennas 130-1 to 130-M. In some embodiments, each receiver 110 is configured with its own reception antenna 130 (e.g., receiver 110-1 with reception antenna 130-1, receiver 110-2 with reception antenna 130-2, receiver 110-M with reception antenna 130-M). Along with receiving the target reflect signals 128, the receivers 110 may receive other unwanted signals. For example, an interferer 132 (in this example, radar signals from another vehicle) transmits interference 134 which is also received by the receivers 110.

As indicated earlier, the radar front end 102 also includes multiple receivers 110-1 to 110-M (collectively referred to as receivers 110). One or more of the receivers 110 includes a low noise amplifier (LNA) 112, a deramp mixer 114, a high pass filter (HPF) 116, a variable gain power amplifier 118, a low pass filter (LPF) 120, and an analog-to-digital converter (ADC) 122 that digitizes the received radar signal prior to providing it to a radar signal processor for estimating a range and velocity of the targets 126.

Referring now to FIG. 2, in some embodiments, the radar system 100 includes a radar master controller processing unit (MCPU) 138. In some embodiments, the radar MCPU 138 includes a radar controller 140 and a receiver (RX) processor 142. The radar controller 140 provides the program, control trigger, and reference clock signals 136 as described above. The receiver processor 140 receives the digitized signals from the radar front end 102, e.g., from the ADCs 122 of the receivers 110. In some embodiments, the RX processor 140 includes an interference cancellation component 144, which provides the interference suppressed ADC samples 146. A fast-time (Range) spectrum component 148 receives and processes the interference suppressed ADC samples 146. For example, the fast-time spectrum component 148 applies an FFT over the fast-time index of the windowed samples to provide range chirp data 150 indicative of chirp reflections received at the reception antennas 130. In some embodiments, the range chirp data 150 is cubed with an x-axis and a y-axis made up of fast time data and a z-axis representing data for each of the reception antennas 130. The range chirp data 150 is received and processed by a slow-time (velocity, or Doppler) spectrum component 152. For example, the slow-time spectrum component 152 applies an FFT over the slow-time index of the windowed samples. In this manner, the slow time spectrum component 152 provides range-Doppler data 154 that is cubed with x-axis and y-axis made up of slow time data and a z-axis representing data for each of the reception antennas 130. In some embodiments, the range Doppler data 154 is received and processed by a constant false alarm rate (CFAR) detection component 154. The detection component 154 provides detected range and Doppler cell data 158. A multiple-input multiple-output (MIMO) array measurement construction component 160 receives and processes the detected range and Doppler cell data 158. The MIMO array measurement construction component 160 provides an array measurement vector 162. The array measurement vector is received and processed by a target Angle of Arrival (AoA) estimation component 164. The target AoA estimation component 164 provides target information 166 attributed to the target 126 detected by radar system 100 to other components via data interface 170. For example, the other components include software modules executed by a processor to implement advanced driver assistant system (ADAS) or autonomous driving (AD) perception and vehicular control systems.

In some embodiments, the radar system 100, including the radar front end 102 and the radar MCPU 138 are configured to implement the transmit signal phase modulation techniques and corresponding signal processing techniques described herein. For example, one or more of the transmitters 104 include one or more conjugate phase rotators that are each configured to generate multiple phase modulated signals based on a common local oscillator signal and a phase control signal. Each one of the multiple phase modulated signals is then input to a different power amplifier that is coupled to one of a plurality of transmit antennas of the radar front end 102. In this manner, the number of phase rotators in the radar front end is reduced while still allowing for MIMO radar implementation.

Figure 3:
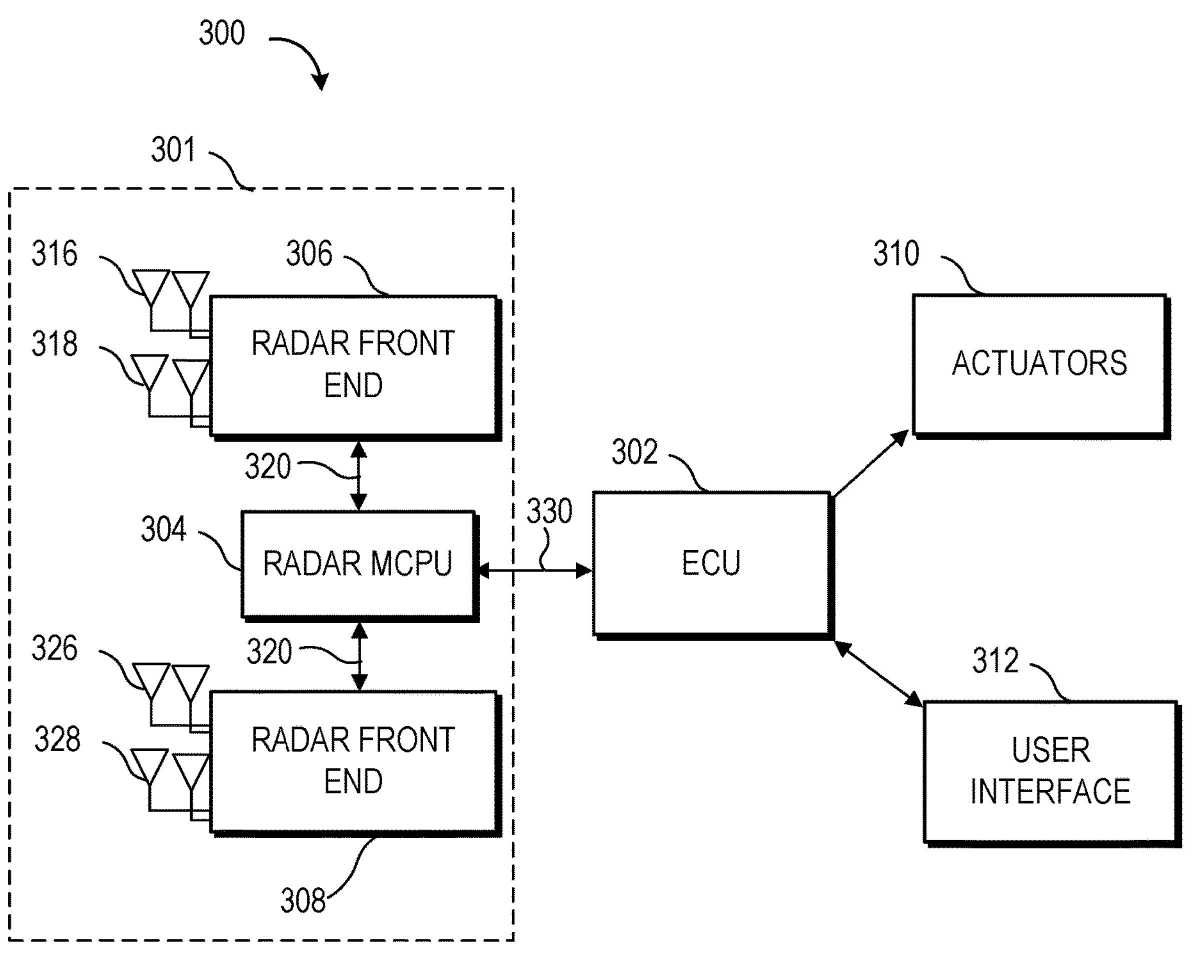
FIG. 3 shows an example of a vehicular control system including a radar system, such as the radar system of FIGS. 1 and 2, in accordance with various embodiments.

FIG. 3 shows an example of a vehicular control system 300 in accordance with some embodiments. The vehicular control system 300 is implemented, for example, in an automobile and may be used to assist in driver-assistance or autonomous driving functions. As illustrated, the vehicular control system 300 includes a radar system 301 which includes radar front ends 306, 308 and a radar MCPU 304. In some embodiments, radar front ends 306, 308 correspond to radar front end 102 in FIG. 1 and radar MCPU 304 corresponds to radar MCPU 138 in FIG. 2.

In some embodiments, the vehicular control system 300 includes an electronic control unit (ECU) 302. The ECU 302 includes processing circuitry, e.g., a central processing unit (CPU), to perform various processing functions related to vehicular control. The radar MCPU 304 is coupled to radar front ends 306, 308 via interfaces 320 and to the ECU 302 via interface 330. While two radar front ends 306, 308, are shown in FIG. 3, this number is for clarity purposes and may be scalable to a larger quantity. In some embodiments, the radar front ends 306, 308 are located at various positions around an automobile housing vehicular control system 300. For example, one radar front end 306 is positioned at the front end of the automobile and the other radar front end 308 is positioned at the rear end of the automobile. In some embodiments, radar front end 306 includes a plurality of antennas 316, 318. For example, plurality of antennas 316 are transmission antennas and plurality of antennas 318 are reception antennas. Similarly, in some embodiments for radar front end 308, the plurality of antennas 326 are transmission antennas and the plurality of antennas 328 are reception antennas. In some embodiments, the plurality of antennas associated with each of radar front ends 306, 308 support MIMO radar configurations. While two antennas are shown for each of the plurality of antennas 316, 318, 326, 328, this number is for clarity purposes and may be scalable to larger quantities (e.g., three, four, or more antennas) in some embodiments.

In some embodiments, the radar MCPU 304 is implemented as a micro-controller unit (MCU) or other processing unit that is configured to execute radar signal processing tasks such as, but not limited to, object identification, computation of object distance, object velocity, and object direction (collectively referred to as "radar information"). In some embodiments, the radar MCPU 304 is additionally configured to generate control signals based on the radar information. The radar MCPU 304 is, for example, configured to generate calibration signals, receive data signals, receive sensor signals, generate frequency spectrum shaping signals (such as signals associated with the FCMW radar techniques described herein) and/or state machine signals for radio frequency (RF) circuit enablement sequences. In addition, in some embodiments, the radar MCPU 304 is configured to program the radar front ends 306, 308 to operate in a coordinated fashion by transmitting MIMO waveforms for use in constructing a virtual aperture from a combination of the distributed apertures formed by the plurality of transmission and reception antennas shown in FIG. 3.

The radar front ends 306, 308, in some embodiments, include radar front end chip circuitry that is coupled to the respective pluralities of antennas to transmit radar signals (e.g., in the form of radar chirp sequences), to receive reflected radar signals, and to digitize these received radar signals for forwarding to the radar MCPU 304 over interface 320. In some embodiments, the radar MCPU 304 performs radar processing tasks based on the digitized radar signals received from the radar front ends 306, 308 to provide radar information to the ECU 302. The ECU 302 uses this radar information to control one or more actuators 310 such as a steering actuator, braking actuator, or throttle actuator to assist in driver-assistance or autonomous driving functions. In some embodiments, the ECU 302 displays the radar information or associated information via a user interface 312 such as a screen display, a speaker, or a light (e.g., in a side mirror or on a dashboard) to alert the driver of nearby objects.

Figure 4:
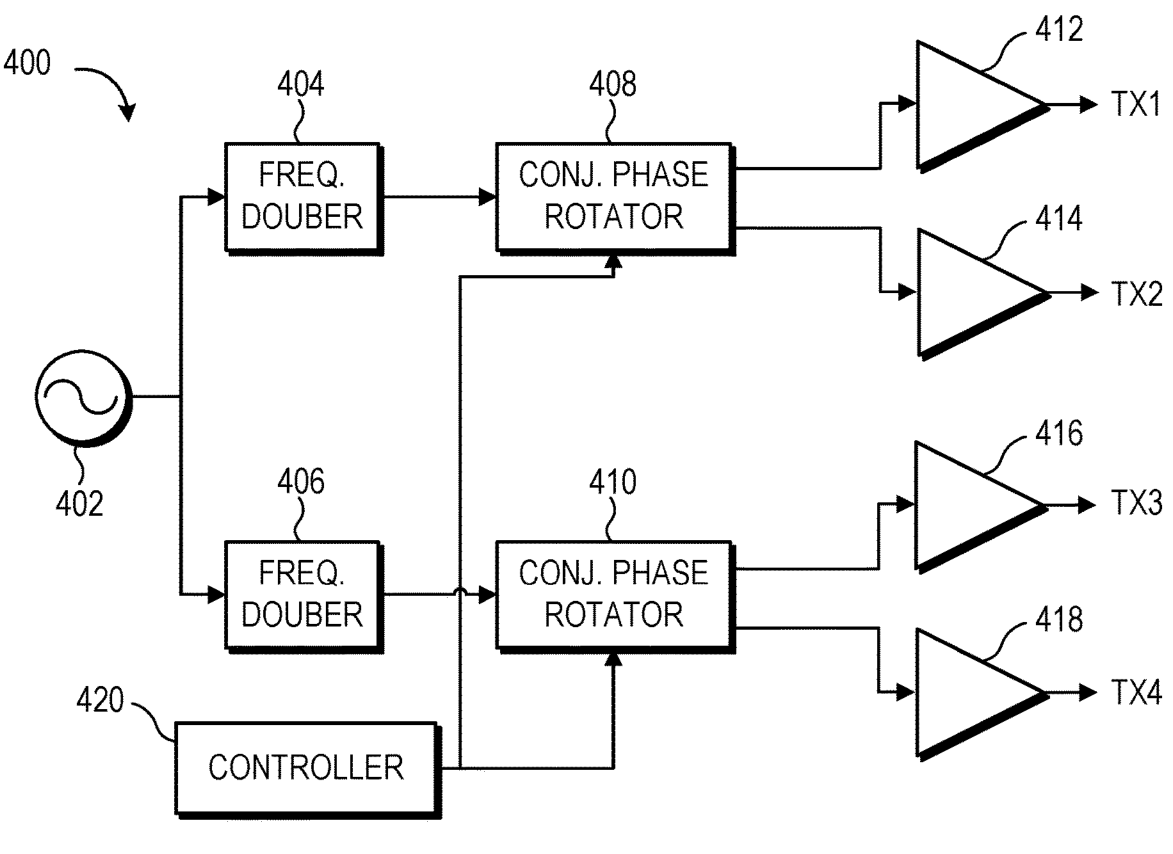
FIG. 4 shows an example of a transmission configuration in a radar front end, such as the radar front end of FIG. 1, in accordance with various embodiments.

FIG. 4 shows an example of a transmission configuration in a radar front end 400, such as radar front end 102 of FIG. 1 or radar front ends 306, 308 of FIG. 3, in accordance with some embodiments. In the illustrated embodiment, the transmission configuration includes a local oscillator (LO) 402, frequency doublers 404-406, conjugate phase rotators 408-410, power amplifiers 412-418, a controller 420, and transmission (TX) outputs TX1-TX4. In some aspects, the frequency doublers 404-406 and the conjugate phase rotators 408-410 are included in the transmitters 104 of FIG. 1 and power amplifiers 412-418 correspond to PAs 106, 107 of FIG. 1. While not shown in FIG. 4, in some cases, the transmission configuration in the radar front end 400 includes additional components that contribute to generate a radar signal for transmission such as power amplifier drivers, power modulators, signal filters, switches, antenna arrays, or the like.

The transmission configuration in the radar front end 400 generates radar signals that are transmitted by multiple transmit antennas (not shown for clarity purposes) coupled to TX outputs TX1-TX4. The radar front end 400 includes a LO 402 to generate an LO signal for the other components in the radar front end 400. For example, the LO signal output from the LO 402 is input to the conjugate phase rotators 408, 410. In some cases, as shown in FIG. 4, the radar front end 400 also includes frequency doublers 404, 406 coupled between the LO 402 and the conjugate phase rotators 408, 410, respectively. For example, in some automotive radar system applications, the LO 402 is implemented in or coupled to the chirp generator 137 and outputs a signal with a frequency in the range of about 38 to 41 gigahertz (GHz). The frequency doublers 404, 406 receive this signal and double the frequency to about 76 to 81 GHz and output the modified (e.g., doubled) LO signal at the higher frequency to each one of the conjugate phase rotators 408, 410.

The radar front end 400 also includes a controller 420 that provides phase control signals to the conjugate phase rotators 408, 410. In some embodiments, the controller 400 is a digital controller such as a digital signal synthesizer or the like. The controller transmits the control signals to each one of the conjugate phase rotators 408, 410 to cause the radar front end 400 to implement a particular MIMO radar signal modulation technique, such as DDM, via the TX antennas coupled to TX outputs TX1-TX4. That is, each one of the control signals communicated from the controller 420 to a conjugate phase rotator 408, 410 is a phase control signal that includes, for example, a particular phase code that the controller 420 instructs the receiving conjugate phase rotator 408, 410 to apply to its input signal. For example, the controller 420 sends a first control signal instructing conjugate phase rotator 408 to apply a first phase code to the input signal received from the LO 402 (e.g., in some cases, via frequency doubler 404), and the controller 420 sends a second control signal instructing conjugate phase rotator 410 to apply a second phase code to the input signal received from the LO 402 (e.g., in some cases, via frequency doubler 406). In this manner, the controller 420 coordinates the conjugate phase rotators 406, 508 to generate particular phase-modulated signals in order to implement a MIMIO radar signal modulation scheme such as DDM.

As such, each one of the conjugate phase rotators 406, 408 is configured to receive at least two inputs. The first input is a LO signal received from the LO 402 (in some cases, through a corresponding frequency doubler 404, 406) and the second input is a control signal including instructions to apply a particular phase code that is received from the controller 420. Based on these two inputs, each conjugate phase rotator 406, 408 is configured to generate a pair of phase modulated output signals: a first output signal and a second output signal that is a complex conjugate of the first output signal. Each one of these pair of phase modulated output signals is transmitted to a different power amplifier (PA) 412-418 that lies on a transmission path to a respective TX output that is coupled to a different TX antenna.

For example, the first conjugate phase rotator 408 receives an LO signal originating from the LO 402 through frequency doubler 404 and a first control signal from the controller 420. Based on these two inputs, the first conjugate phase rotator 408 outputs a pair of phase modulated signals. The first of these phase modulated signals is input into a first power amplifier 412, and the second of these phase modulated signals is input into a second power amplifier 414. Similarly, the second conjugate phase rotator 410 receives the LO signal originating from the LO 402 through frequency doubler 406 and a second control signal from the controller 420. Based on these two inputs, the second conjugate phase rotator 410 outputs a pair of phase modulated signals. The first of these phase modulated signals is input into a third power amplifier 416, and the second of these phase modulated signals is input into a fourth power amplifier 418. Each one of the four power amplifiers 412-418 is coupled to a respective TX output TX1-TX4. Thus, instead of requiring four phase rotators to generate four different phase modulated signals as needed according to conventional techniques, the radar front end 400 employs conjugate phase rotators 408, 410 to reduce the number of phase rotators required by half. In some embodiments, the conjugate phase rotators 408, 410 are N-bit phase rotators, where N is an integer greater than 1. For example, in some embodiments, the conjugate phase rotators 408, 410 are 7-bit conjugate phase rotators 408, 410.

Although shown as including two conjugate phase rotators and four TX outputs in radar front end 400, in other embodiments, a different number of conjugate phase rotators and TX outputs is implemented in the radar front end 400. For example, the number of conjugate phase rotators in the radar front end 400 is greater than two (e.g., 3, 4, 5, 6, or more), and the corresponding number of TX outputs is twice the number of the conjugate phase rotators.

Figure 5:
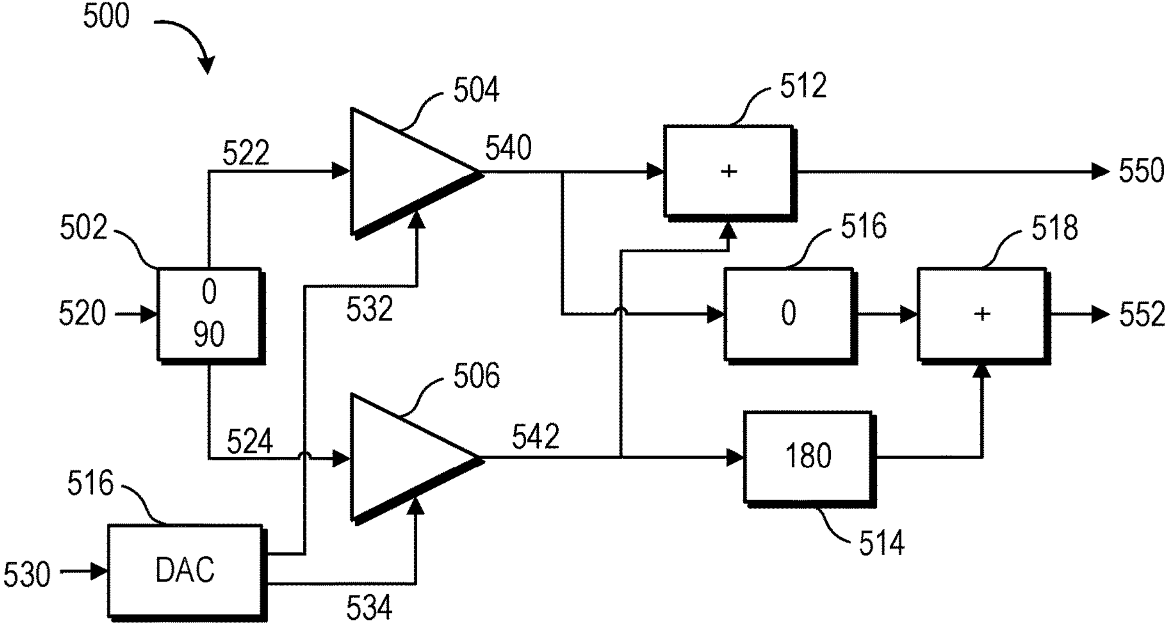
FIG. 5 shows an example configuration of a conjugate phase rotator, such as one of the conjugate phase rotators of FIG. 4, in accordance with various embodiments.

FIG. 5 shows an example configuration of a conjugate phase rotator 500, such as one of the conjugate phase rotators 408, 410 of FIG. 4, in accordance with some embodiments. The conjugate phase rotator 500 is configured to receive two input signals 520, 530. The first input signal 520 is an LO signal received from an LO source such as LO 402 of FIG. 4. In some cases, the LO source transmits the first input signal 520 via an intermediate frequency doubler such as one of frequency doublers 404, 406 of FIG. 4. The second signal 530 is a phase control signal that is received from a digital controller such as controller 420 of FIG. 4. Based on these two input signals, the conjugate phase rotator 500 is configured to generate a pair of phase modulated output signals 550, 552. In some embodiments, the second phase modulated output signal 552 is a complex conjugate of the first phase modulated output signal 550. Each one of the pair of phase modulated output signals 550, 552 is transmitted to a different power amplifier prior to being transmitted by a corresponding transmission (TX) antenna. Thus, a single conjugate phase rotator 500 generates a pair of phase modulated output signals 550, 552 that may be utilized for implementing a MIMO radar signal modulation scheme such as DDM in a radar front end. This reduces the number of phase rotators required in the radar front end.

The conjugate phase rotator 500 includes a 0/90 degrees phase splitter 502 that receives the first input signal 520 from an LO source (e.g., such as LO 402 of FIG. 4). Based on the first input signal 520 (also referred to as the local oscillator input signal) received from the LO source, the 0/90 degrees phase splitter 502 generates an in-phase signal 522 and a quadrature-phase signal 524. The in-phase signal 522 is input into a first gain-controlled amplifier 504, and the quadrature-phase signal 524 is input into a second gain-controlled amplifier 506. The conjugate phase rotator 500 also includes a digital-to-analog converter (DAC) 516 that receives a second input signal 530 from a digital controller (e.g., such as controller 420 of FIG. 4). Based on the second input signal 530 (also referred to as the phase control signal) received from the digital controller, the DAC 516 generates two analog signals: an in-phase gain control signal 532 that the DAC 516 transmits to the first gain-controlled amplifier 504 and a quadrature-phase gain control signal 534 that the DAC 516 transmits to the second gain-controlled amplifier 506. Based on the two inputs 522, 532 received from the 0/90 degrees phase splitter 502 and the DAC 516, respectively, the first gain-controlled amplifier 504 outputs an in-phase intermediate signal 540. Based on the two inputs 524, 534 received from the 0/90 degrees phase splitter 502 and the DAC 516, respectively, the second gain-controlled amplifier 505 outputs a quadrature-phase intermediate signal 542.

The in-phase intermediate signal 540 output from the first gain-controlled amplifier 504 is transmitted to two components: the first component is a first combiner 512 and the second component is a 0-degree phase shift component 516. The quadrature-phase intermediate signal 542 output from the second gain-controlled amplifier 506 is also transmitted to two components: the first component is the first combiner 512 and the second component is a 180-degree phase inverter 514. The first combiner 512 combines the in-phase intermediate signal 540 and the quadrature-phase intermediate signal 542 to generate a first phase modulated signal 550. The second combiner 518 combines the in-phase intermediate signal 540 and an inversion of the quadrature-phase intermediate signal 542 received via 180-degree phase inverter 514 to generate a second phase modulated signal 552. The second phase modulated signal 552 output by the conjugate phase rotator 500 is a complex conjugate of the first phase modulated signal. As such, the conjugate phase rotator 500 generates two phase modulated signals 550, 552, wherein one of these phase modulated signals is the complex conjugate of the other. Thus, a single conjugate phase rotator 500 is implemented in the radar front end to generate two separate and distinctly phase-coded radar signals for transmission where two phase rotators would be required according to conventional techniques. Accordingly, the number of phase rotators in the radar front end is reduced, thereby reducing the die area occupied by the radar front end as well as reducing power dissipation in the radar front end.

In addition to reducing the number of phase rotators required by the radar front end to implement a radar modulation coding scheme such as DDM, the radar transmission configuration techniques described herein provide additional advantages at the signal processing side. For example, by generating phase modulated radar signals according to the techniques described above, the radar system generates two sets of offset frequencies, with one set being the image (i.e., negative) of the other set. For example, referring to FIGS. 4-5, the first set of offset frequencies include the first phase modulated signal 550 output from each respective conjugate phase rotator 408, 410 and the second set of offset frequencies includes the second phase modulated 552 (which is the complex conjugate of the first phase modulated signal 550) output from each respective conjugate phase rotator 408, 410. Additionally, the intervals between the frequencies within each set are not integer multiples of one another. This facilitates the identification of each received phase modulate signal at the signal processing side. In this manner, the radar transmission configuration techniques allow for the detection of any cyclic shift up to an integer multiple of the number of waveforms used in the measurement sequence. This facilitates signal processing of the received radar signals and improves radar system performance.

Figure 6:
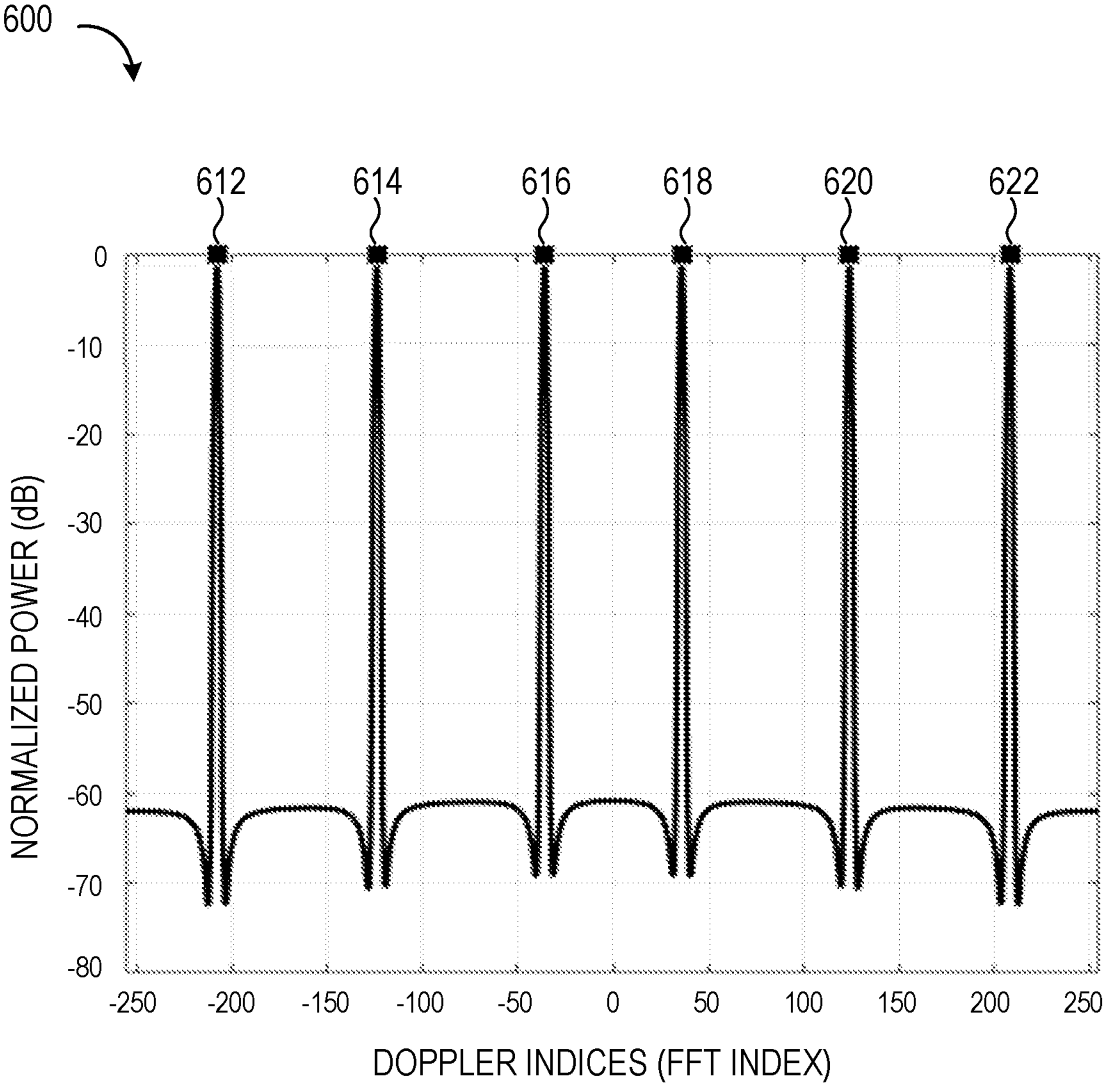
FIG. 6 shows an example of a graph illustrating a pattern of frequency offsets that is generated by a radar transmission configuration in accordance with some embodiments.

FIG. 6 illustrates a graph 600 illustrating a pattern of frequency offsets 612-622 that is generated by the radar transmission configuration in accordance with some embodiments.

Generally speaking, MIMO coding schemes aim to generate transmit signals that are orthogonal to one another. In DDM, for example, this is achieved by simultaneously transmitting a number (N) of identical waveforms at small frequency offsets from multiple transmitters at the radar front end. In some cases, the frequency offsets are smaller than the range of the frequencies associated to a single range gate, and the frequency offsets may be of similar magnitude as the Doppler frequency of the reflected radar signals. Therefore, a single target can be represented by a number of spectral peaks in the Doppler spectrum that is associated with the distance to the target. At the receiver, in the case of multiple transmitters in a MIMO setup, the received signals are decoded to produce N orthogonal signals for each receive element at the receiver. A typical problem using this approach is that under the influence of Doppler shifts, the Doppler spectrum cyclically rotates with respect to the assigned Doppler frequency ranges. The spectral peaks are still identifiable under these conditions but their association to their corresponding transmit antenna may be lost. Conventional approaches to solve this problem include increasing the number of frequency offsets to be greater than the number of transmitters. However, these conventional approaches have several disadvantages such as increasing the hardware complexity due to requiring higher resolution phase rotators and/or inefficient use of the Doppler spectrum since the Doppler peaks are spaced closer together, which in turn increases the likelihood of overlapping Doppler peaks in multi-target scenarios. In addition, another drawback of conventional radar transmission configurations is that they tend to produce uniform Doppler peak patterns in some multi-target scenarios. As such, any secondary target with a relatively normalized Doppler shift as compared to that of a primary target will generate Doppler peak patterns that at least partially overlap with the Doppler peak pattern of the primary target, which diminishes radar system performance.

To overcome the overlapping and repetitive Doppler peak interval pattern produced by conventional radar systems, the radar systems described herein (e.g., the radar systems including the radar transmission configurations based on the conjugate phase rotators described in FIGS. 1-5) generate an irregular interval spacing between Doppler peaks in the Doppler spectrum. That is, by moving the binary phase shift keying (BPSK) components into the conjugate phase rotators before the stage at which the in-phase and quadrature signals are combined as shown in FIG. 5, multiple unique frequency offsets are generated in addition to the image (i.e., negative) frequencies. For example, using 3 conjugate phase rotators (such as those depicted for conjugate phase rotators 408, 410 of FIG. 4 or for conjugate phase rotator 500 of FIG. 5) coupled to 6 TX elements, a Doppler peak pattern such as one shown in graph 600 of FIG. 6 can be generated.

Graph 600 shows a Doppler peak pattern with Doppler peaks 612-622. The x-axis of graph 600 shows the Doppler indices (in FFT indices) and the y-axis shows the normalized power (in dB). The FFT indices of the x-axis are associated to a sampling frequency which is the inverse of the chirp duration. Doppler peak 612 is positioned at the −208 FFT index, Doppler peak 614 is positioned at the −124 FFT index, Doppler peak 616 is positioned at the −36 FFT index, Doppler peak 618 is positioned at the 36 FFT index, Doppler peak 620 is positioned at the 124 FFT index, and Doppler peak 622 is positioned at the 208 FFT index. In the illustrated embodiment, the Doppler peak pattern includes three unique frequency offsets 618, 620, and 622 along with their respective complex conjugates 616, 614, and 612. That is, by using three conjugate phase rotators such as those shown in FIGS. 4 and 5, a Doppler peak pattern can be generated based on the received reflections of the transmitted signals that includes three unique frequency offsets that are not spectrally shifted, by rather mirrored around the 0 FFT Index with unique (i.e., unequal) spacings between the peaks. This breaks the cyclic repetitive structure of the Doppler peak patterns produced by conventional radar systems and allows for estimation of the possible spectral shifts. The conjugate behavior is indicated by the opposite signs of each Doppler peak pair, e.g., Doppler peak pair 616 and 618, Doppler peak pair 614 and 630, and Doppler peak pair 612 and 622.

Figure 7:
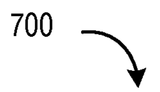
FIG. 7 shows an example of a method flowchart of a radar modulation technique in accordance with various embodiments.
Figure 7:
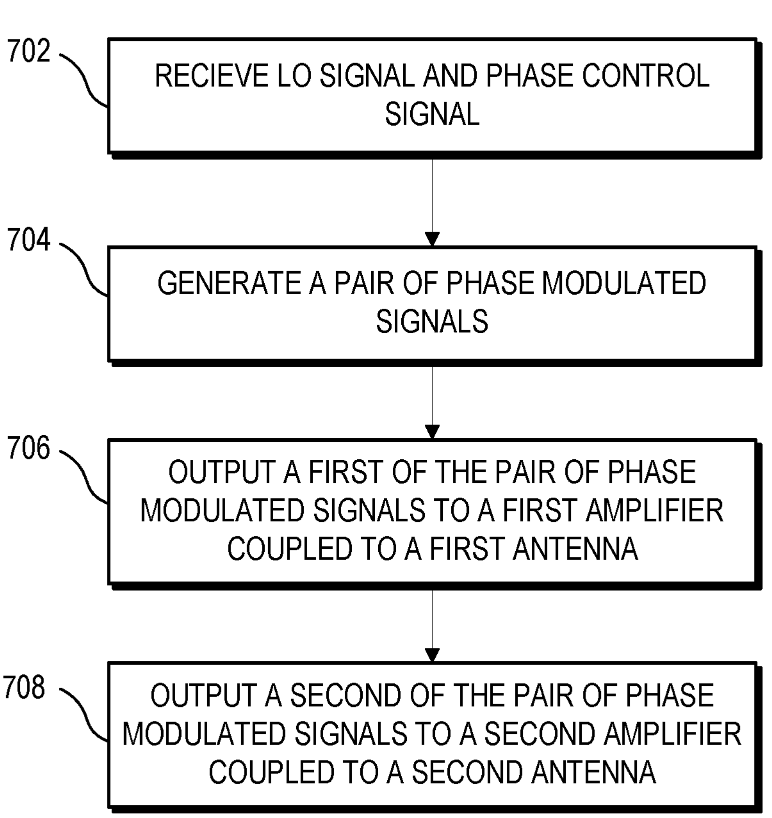

FIG. 7 shows a flowchart 700 describing a radar modulation technique in accordance with some embodiments. The method shown in flowchart 700 is implemented by a radar system such as one shown in FIGS. 1-3 based on a transmission configuration such as the one shown in FIG. 4 which implements conjugate phase rotators such as the one shown in FIG. 5.

At 702, the method includes receiving, at a conjugate phase rotator such as that shown in FIGS. 4 and 5, a LO signal and a phase control signal. For example, in some embodiments, a LO source such as LO 402 of FIG. 4 generates the LO signal, and a controller such as controller 420 of FIG. 4 generates the phase control signal.

At 704, the conjugate phase rotator generates a pair of phase modulated signals based on the LO signal and the phase control signal received at 702. In some embodiments, the second phase modulated signal of the pair of phase modulated signals is the complex conjugate of the first phase modulated signal of the pair of phase modulated signals. For example, referring to FIG. 5, the pair of phase modulated signals correspond to signals 550, 552.

At 708, the conjugate phase rotator outputs a first phase modulated signal of the pair of phase modulated signals to a first amplifier coupled to a first transmit antenna. For example, referring to FIG. 4, the first conjugate phase rotator

408 outputs the first phase modulated signal of the pair of phase modulated signals to PA 412 coupled to TX1.

At 710, the conjugate phase rotator outputs a second phase modulated signal of the pair of phase modulated signals to a second amplifier coupled to a second transmit antenna. For example, referring to FIG. 4, the first conjugate phase rotator 408 outputs the second phase modulated signal of the pair of phase modulated signals to PA 414 coupled to TX2.

In a first embodiment, a radar front end includes a plurality of transmit antennas and a plurality of phase rotators. Each phase rotator of the plurality of phase rotators is configured to output multiple phase modulated signals to a corresponding set of power amplifiers of a plurality of power amplifiers, and each power amplifier of the plurality of power amplifiers is coupled to a transmit antenna of the plurality of transmit antennas.

In some aspects of the first embodiment, each phase rotator of the plurality of phase rotators is configured to output at least two conjugate phase modulated signals. In some aspects, the radar front end also includes a controller to provide phase control signals to the plurality of phase rotators to generate signals for transmission via the plurality of antennas, and each phase rotator of the plurality of phase rotators is configured to output the at least two conjugate phase modulated signals based on a phase control signal from the controller and a local oscillator input signal.

In some aspects of the first embodiment, each phase rotator includes a phase splitter and a pair of gain controlled amplifiers. The phase splitter receives the local oscillator input signal and generates a first intermediate phase signal and a second intermediate phase signal. The first intermediate phase signal is input to a first gain controlled amplifier of the pair of gain controlled amplifiers and the second intermediate phase signal is input to a second gain controlled amplifier of the pair of gain controlled amplifiers. In some aspects, the first intermediate phase signal is an in-phase signal based on the local oscillator input signal, and the first gain controlled amplifier is configured to receive an in-phase control signal from the controller, and the second intermediate phase signal is a quadrature-phase signal based on the local oscillator input signal, and the second gain controlled amplifier is configured to receive a quadrature-phase control signal from the controller.

In some aspects of the first embodiment, each phase rotator includes a first combiner to combine an output of the first gain controlled amplifier and an output of the second gain controlled amplifier to generate a first conjugate phase modulated signal of the at least two conjugate phase modulated signals. Additionally, in some aspects, each phase rotator includes a second combiner configured to combine an output of the first gain controlled amplifier and an inverted output of the second gain controlled amplifier to generate a second conjugate phase modulated signal of the at least two conjugate phase modulated signals. Furthermore, in some aspects, each phase rotator includes an inverter coupled between the second gain controlled amplifier and the second combiner.

In some aspects of the first embodiment, each signal of the at least two conjugate phase modulated signals includes a first phase modulated signal at a first frequency offset and a second phase modulated signal at a second frequency offset that is mirrored about an index value from the first frequency offset. In some aspects, the first phase modulated signal is input to a first power amplifier of the corresponding set of power amplifiers and the second phase modulated signal is input to a second power amplifier of the corresponding set of power amplifiers.

In some aspects of the first embodiment, the radar front end includes a frequency doubler coupled between each one of the plurality of phase rotators and a local oscillator.

In a second embodiment, a method includes generating, at each phase rotator of a plurality of phase rotators, a plurality of phase modulated signals based on a phase control signal and a local oscillator signal, and inputting each phase modulated signal of the plurality of phase modulated signals to one of a plurality of power amplifiers, wherein each power amplifier of the plurality of power amplifiers is coupled to a corresponding transmit antenna.

In some aspects of the second embodiment, the method includes receiving the phase control signal from a controller. In some aspects of the second embodiment, the plurality of phase modulated signals includes two conjugate phase modulated signals.

In some aspects of the second embodiment, each phase rotator of the plurality of phase rotators is a conjugate phase rotator, and the method includes receiving, at a phase splitter of the conjugate phase rotator, the local oscillator signal, and generating, at the phase splitter, a first intermediate phase signal and a second intermediate phase signal. The first intermediate phase signal is an in-phase signal of the local oscillator signal, and the second intermediate phase signal is a quadrature-phased signal of the local oscillator signal. In some aspects of the second embodiment, the method includes inputting the first intermediate phase signal to a first gain controlled amplifier of a pair of gain controlled amplifiers in the conjugate phase rotator, and inputting the second intermediate phase signal to a second gain controlled amplifier of the pair of gain controlled amplifiers in the conjugate phase rotator. In some aspects of the second embodiment, the method includes receiving, at the first gain controlled amplifier, an in-phase variable control signal component of the phase control signal; receiving, at the second gain controlled amplifier, a quadrature-phased variable control signal component of the phase control signal; and combining, at a first combiner in the conjugate phase rotator, an output of the first gain controlled amplifier and an output of the second gain controlled amplifier to generate a first phase modulated signal of the two conjugate phase modulated signals. In some aspects, the method includes combining the output of the first gain controlled amplifier and an inverted output of the second gain controlled amplifier to generate a second phase modulated signal of the two conjugate phase modulated signals.

In a third embodiment, a radar system includes a radar front end and a radar processor. The radar front end includes a plurality of transmit antennas and a plurality of phase rotators, each phase rotator of the plurality of phase rotators configured to output multiple phase modulated signals to a corresponding set of power amplifiers of a plurality of power amplifiers, wherein each power amplifier of the plurality of power amplifiers is coupled to a transmit antenna of the plurality of transmit antennas. The radar front end also includes a controller to provide control signals to the plurality of phase rotators to generate signals for transmission via the plurality of transmit antennas. The radar front end includes a plurality of receive antennas to receive reflections of signals transmitted from the plurality of transmit antennas. The radar system also includes a radar processor to perform range and velocity estimates of a surrounding environment of the radar system based on digitized samples of the received reflections.

In some aspects of the third embodiment, each phase rotator of the plurality of phase rotators is configured to output the multiple phase modulated signals including two conjugate phase modulated signals based on a phase control signal from the digital controller and a local oscillator input signal.

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A radar front end comprising:

a plurality of transmit antennas;

a plurality of power amplifiers, each power amplifier coupled to one of the plurality of transmit antennas; and a plurality of phase rotators, each phase rotator of the plurality of phase rotators coupled to a corresponding set of the plurality of power amplifiers and configured to output multiple phase modulated signals to the corresponding set of the plurality of power amplifiers, the corresponding set including a first power amplifier and a second power amplifier, each phase rotator configured to output a first conjugate phase modulated signal to the first power amplifier and a second conjugate phase modulated signal to the second power amplifier.

2. The radar front end of claim 1, further comprising:

a controller to provide phase control signals to the plurality of phase rotators to generate signals for transmission via the plurality of transmit antennas, wherein each phase rotator of the plurality of phase rotators is configured to output the first conjugate phase modulated signal and the second conjugate phase modulated signal based on a phase control signal from the controller and a local oscillator input signal.

3. The radar front end of claim 2, wherein each phase rotator comprises a phase splitter and a pair of gain controlled amplifiers, the phase splitter to receive the local oscillator input signal and generate a first intermediate phase signal and a second intermediate phase signal, the first intermediate phase signal input to a first gain controlled amplifier of the pair of gain controlled amplifiers and the second intermediate phase signal input to a second gain controlled amplifier of the pair of gain controlled amplifiers.

4. The radar front end of claim 3, wherein the first intermediate phase signal is an in-phase signal based on the local oscillator input signal, and the first gain controlled amplifier is configured to receive an in-phase control signal from the controller, and wherein the second intermediate phase signal is a quadrature-phase signal based on the local oscillator input signal, and the second gain controlled amplifier is configured to receive a quadrature-phase control signal from the controller.

5. The radar front end of claim 4, wherein each phase rotator comprises a first combiner to combine an output of the first gain controlled amplifier and an output of the second gain controlled amplifier to generate the first conjugate phase modulated signal.

6. The radar front end of claim 4, wherein each phase rotator comprises a second combiner configured to combine an output of the first gain controlled amplifier and an inverted output of the second gain controlled amplifier to generate the second conjugate phase modulated signal.

7. The radar front end of claim 6, wherein each phase rotator comprises an inverter coupled between the second gain controlled amplifier and the second combiner.

8. The radar front end of claim 1, the first conjugate phase modulated signal has a first frequency offset and the second conjugate phase modulated signal has a second frequency offset that is mirrored about an index value from the first frequency offset.

9. The radar front end of claim 8, wherein the first conjugate phase modulated signal is input to a first power amplifier of the corresponding set of power amplifiers and the second conjugate phase modulated signal is input to a second power amplifier of the corresponding set of power amplifiers.

10. The radar front end of claim 1, further comprising a frequency doubler coupled between each one of the plurality of phase rotators and a local oscillator.

11. A method comprising:

generating, at each phase rotator of a plurality of phase rotators, a plurality of phase modulated signals based on a phase control signal and a local oscillator signal; and inputting each phase modulated signal of the plurality of phase modulated signals to one of a plurality of power amplifiers, wherein each power amplifier of the plurality of power amplifiers is coupled to a corresponding transmit antenna; and wherein each phase rotator is coupled to a first power amplifier and a second power amplifier of the plurality of power amplifier and is configured to input a first conjugate phase modulated signal of the plurality of phase modulated signals to the first power amplifier and to input a second conjugate phase modulated signal of the plurality of phase modulated signals to the second power amplifier.

12. The method of claim 11, further comprising receiving the phase control signal from a controller.

13. The method of claim 11, wherein each phase rotator of the plurality of phase rotators is a conjugate phase rotator, the method further comprising:

receiving, at a phase splitter of the conjugate phase rotator, the local oscillator signal; and generating, at the phase splitter, a first intermediate phase signal and a second intermediate phase signal, wherein the first intermediate phase signal is an in-phase signal of the local oscillator signal and the second intermediate phase signal is a quadrature-phased signal of the local oscillator signal.

14. The method of claim 13, further comprising:

inputting the first intermediate phase signal to a first gain controlled amplifier of a pair of gain controlled amplifiers in the conjugate phase rotator; and inputting the second intermediate phase signal to a second gain controlled amplifier of the pair of gain controlled amplifiers in the conjugate phase rotator.

15. The method of claim 14, further comprising:

receiving, at the first gain controlled amplifier, an in-phase variable control signal component of the phase control signal;

receiving, at the second gain controlled amplifier, a quadrature-phased variable control signal component of the phase control signal; and combining, at a first combiner in the conjugate phase rotator, an output of the first gain controlled amplifier and an output of the second gain controlled amplifier to generate the first conjugate phase modulated signal.

16. The method of claim 15, further comprising:

combining the output of the first gain controlled amplifier and an inverted output of the second gain controlled amplifier to generate the second conjugate phase modulated signal.

17. A radar system comprising:

a radar front end comprising:

a plurality of transmit antennas;

a plurality of power amplifiers, each power amplifier coupled to one of the plurality of transmit antennas;

a plurality of phase rotators, each phase rotator of the plurality of phase rotators configured to output multiple phase modulated signals to a corresponding set of the plurality of power amplifiers, the corresponding set including a first power amplifier and a second power amplifier, each phase rotator configured to output a first conjugate phase modulated signal to the first power amplifier and a second conjugate phase modulated signal to the second power amplifier;

a controller to provide control signals to the plurality of phase rotators to generate signals for transmission via the plurality of transmit antennas; and a plurality of receive antennas to receive reflections of signals transmitted from the plurality of transmit antennas; and a radar processor to perform range and velocity estimates of a surrounding environment of the radar system based on digitized samples of the received reflections.

18. The radar system of claim 17, wherein each phase rotator of the plurality of phase rotators is configured to output the multiple phase modulated signals comprising the first conjugate phase modulated signal and the second conjugate phase modulated signal based on a phase control signal from the controller and a local oscillator input signal.

* * * * *